United States Patent
Miller (10) Patent No.: US 8,395,492 B2
(45) Date of Patent: Mar. 12, 2013

(54) TIRE MONITORING IN VEHICLES

(75) Inventor: Trent Daryl Miller, Renton, WA (US)

(73) Assignee: The Boeing Company, Chicago, IL (US)

( * ) Notice: Subject to any disclaimer, the term of this patent is extended or adjusted under 35 U.S.C. 154(b) by 348 days.

(21) Appl. No.: 12/891,546

(22) Filed: Sep. 27, 2010

(65) Prior Publication Data

US 2012/0075089 A1   Mar. 29, 2012

(51) Int. Cl.
*B60C 23/00* (2006.01)
*G01C 3/20* (2006.01)

(52) U.S. Cl. .............. 340/443; 340/426.33; 340/440; 340/557; 340/666; 73/146.2; 73/146.5; 356/11

(58) Field of Classification Search ............ 340/443
See application file for complete search history.

(56) References Cited

U.S. PATENT DOCUMENTS

| 4,724,704 A * | 2/1988 | Alain ................. 73/146.2 |
| 2004/0051860 A1* | 3/2004 | Honda et al. ........... 356/4.01 |
| 2005/0030525 A1* | 2/2005 | Forster et al. ......... 356/139.09 |

FOREIGN PATENT DOCUMENTS

| GB | 2314660 A | 1/1998 |
| WO | 2009138687 A2 | 11/2009 |
| WO | 2010116094 A1 | 10/2010 |
| WO | 2010116095 A1 | 10/2010 |

OTHER PUBLICATIONS

"TireChek Tire Pressure Monitor", pp. 1-8, retrieved Sep. 27, 2010 http://mb-soft.com/tirechek/index.html.
PCT Search report dated Oct. 31, 2011 regarding International application PCT/USU2011/050438, International filing date Sep. 2, 2011, (10 PAGES).

* cited by examiner

*Primary Examiner* — Donnie Crosland
(74) *Attorney, Agent, or Firm* — Yee & Associates, P.C.

(57) ABSTRACT

An apparatus, method, and computer program product for monitoring a tire are provided. An apparatus comprises a laser system comprising a number of lasers configured to identify a radius of a tire of a vehicle located on a ground, wherein a laser in the number of lasers is associated with an axle of the tire. The apparatus also comprises a tire monitoring system configured to identify a set of acceptable radii for the tire using a weight of the vehicle and information about the tire, determine whether the radius of the tire is within the set of acceptable radii, and generate an indication that the radius of the tire is not within the set of acceptable radii comprising the radius of the tire responsive to an absence of a determination that the radius of the tire is within the set of acceptable radii.

20 Claims, 8 Drawing Sheets

TIRE LOAD AT $P_{ambient}$ PRESSURE

TIRE MONITORING IN VEHICLES

BACKGROUND INFORMATION

1. Field

The present disclosure relates generally to vehicle management. More specifically, the present disclosure relates to an apparatus, method, and computer program product for monitoring a tire of a vehicle.

2. Background

Tires are filled with a gas to allow a vehicle to roll along a surface. The gas generates pressure in the space between the tire and the inner rim. The pressure supports the weight of the vehicle and raises the inner rim off the ground. The pressure also allows the vehicle to move along the surface by rotating the tire. Of course, many vehicles have more than one tire to balance the weight of the vehicle. For example, an automobile may have four tires over which the weight of the automobile may be distributed.

When the weight of the vehicle is loaded onto a tire, the tire may become deflected. Deflection change in the shape of the tire when the weight of a vehicle is applied to a tire. Different amounts of deflection may occur under different loads. For a constant tire pressure, the deflection of the tire increases with the weight being applied to the tire. Likewise, at constant pressure, deflection decreases as the weight being applied to the tire decreases. Additionally, as tire pressure decreases and for a constant weight applied to the tire, deflection of the tire increases.

During normal use, pressure in a tire may decrease as time elapses due to environmental forces, inconsistencies in the tire, or other suitable factors. Tires being used in a vehicle are thus refilled to a rated pressure at various intervals. In an aircraft, maintenance on the tires, such as refilling, may take place after a particular number of days has elapsed.

Refilling of tires may be performed such that the pressure in the tire is sufficient to prevent the tire from exceeding rated deflection. Rated deflection is the maximum allowed deflection of the tire, determined by both the maximum load and the maximum pressure recommended by the manufacturer of the tire or another suitable party for the parameters under which the tire is to be used. The maximum load and maximum pressure are the rated load and rated pressure, respectively. Parameters under which the tire is to be used may include the temperature of the environment, the type of tire, the brand of the tire, the size of the tire, and the weight of the vehicle.

When deflection of a tire is above a recommended amount of deflection, the tire may develop inconsistencies. These inconsistencies result from repeated overdeflection of the tire, causing excessive internal heat. Excessive heat can change properties of the material of the tire. For example, adherence of the tread to the tire may be reduced. Additionally, the usable life of the tire may be reduced. As the usable life of the tire is reduced, the cost and time for maintaining the vehicle increases.

Accordingly, it would be advantageous to have a method and apparatus which takes into account one or more of the issues discussed above, as well as possibly other issues.

SUMMARY

An apparatus, method, and computer program product for monitoring a tire are provided. An apparatus comprises a laser system comprising a number of lasers configured to identify a radius of a tire of a vehicle located on a ground, wherein a laser in the number of lasers is associated with an axle of the tire. The apparatus also comprises a tire monitoring system configured to identify a set of acceptable radii for the tire using a weight of the vehicle and information about the tire, determine whether the radius of the tire is within the set of acceptable radii, and generate an indication that the radius of the tire is not within the set of acceptable radii comprising the radius of the tire, responsive to an absence of a determination that the radius of the tire is within the set of acceptable radii.

A method for monitoring a tire is also provided. A radius of the tire of a vehicle located on a ground is identified using a number of lasers. A set of acceptable radii of the tire is identified using the weight of the vehicle and information about the tire. A determination is made whether a radius of the tire is within the set of acceptable radii. Responsive to an absence of a determination that the radius of the tire is within the set of acceptable radii, an indication that the radius of the tire is not within the set of acceptable radii comprising the radius of the tire is generated.

A computer program product for monitoring a tire is also provided. The computer program product comprises a computer readable storage medium. The computer program product also comprises program code, stored on the computer readable storage medium, for identifying a radius of the tire of a vehicle located on a ground using a number of lasers, program code, stored on the computer readable storage medium, for identifying a set of acceptable radii of the tire using the weight of the vehicle and information about the tire, program code, stored on the computer readable storage medium, for determining whether a radius of the tire is within the set of acceptable radii, and program code, stored on the computer readable storage medium, for generating an indication that the radius of the tire is not within the set of acceptable radii comprising the radius of the tire responsive to an absence of a determination that the radius of the tire is within the set of acceptable radii.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
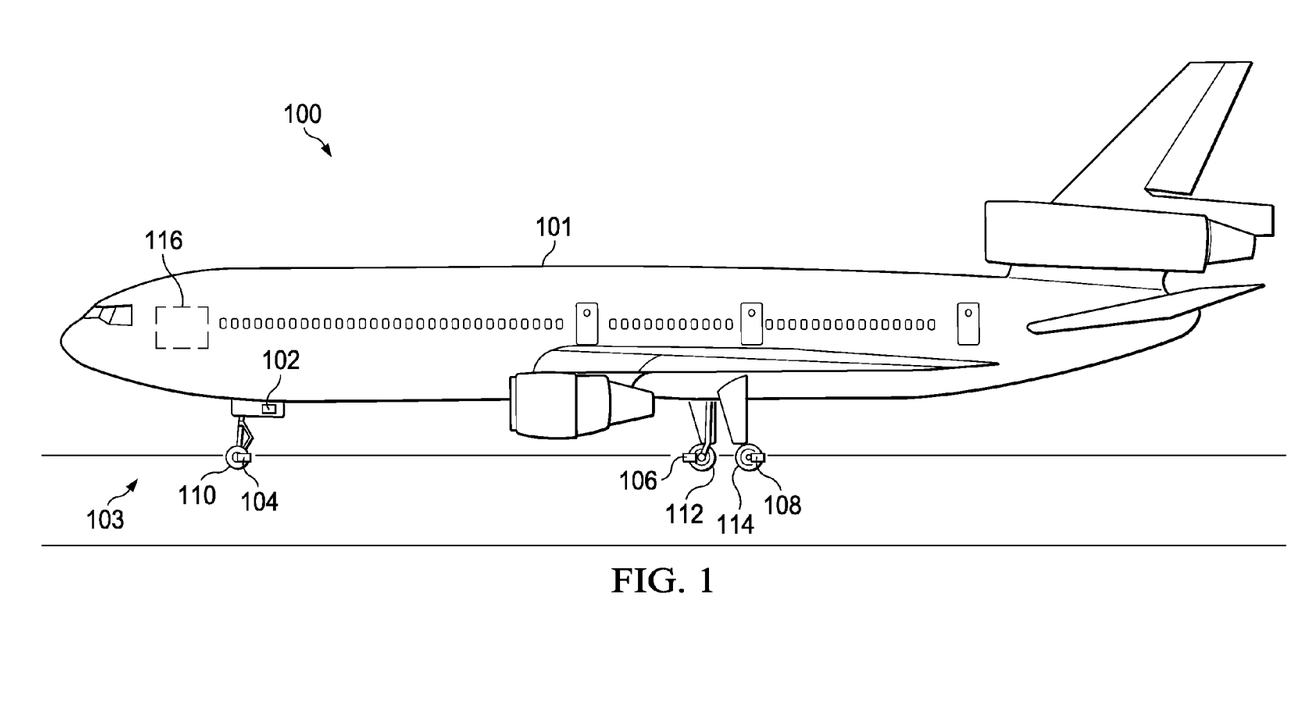
FIG. 1 depicts an illustration of a tire monitoring environment in accordance with an advantageous embodiment.

Looking now to the figures, and with specificity to FIG. 1, an illustration of a tire monitoring environment is depicted in accordance with an advantageous embodiment. Tire monitoring environment 100 is an example of an environment in which advantageous embodiments may be implemented.

Tire monitoring environment 100 contains aircraft 101 and ground 103. Aircraft 101 moves while on ground 103 by rolling on tire 110, tire 112, and tire 114. Tires 110, 112, and 114 are monitored by tire monitoring system 116. Tire monitoring system 116 is located aboard aircraft 101 in this advantageous embodiment.

Tire monitoring system 116 monitors tire 110 by identifying the radius of tire 110 while aircraft 101 is traveling on ground 103. Tire monitoring system 116 identifies the radius of tire 110 using laser 104. Laser 104 is associated with the axle for tire 110 and identifies the distance between the axle and ground 103. In these examples, laser 104 is located on the center line of the axle for tire 110.

Tire monitoring system 116 receives a number of measurements for each of the distances identified by laser 104. Tire monitoring system 116 then uses the number of measurements to identify the radius of tire 110. Of course, tire monitoring system 116 may increase or reduce the distance received from laser 104 prior to identifying the radius of tire 110, based on the location of laser 104.

In some advantageous embodiments, surface monitoring system 102 is also present in tire monitoring environment 100. Surface monitoring system 102 consists of a plurality of lasers. Surface monitoring system 102 is located in the wheel well for tire 110 on aircraft 101 in these examples. Of course, surface monitoring system 102 may be located elsewhere in other advantageous embodiments. The plurality of lasers are located such that at least one laser is directed at the ground on each side of tire 110. In these examples, surface monitoring system 102 is directed at the ground such that a laser beam reaches the ground adjacent to the tire on the inboard and outboard sides of the tire.

Surface monitoring system 102 determines whether ground 103 is uniform. Ground 103 is uniform when ground 103 does not have inconsistencies in the area at which surface monitoring system 102 is directed. The inconsistencies may consist of a discontinuous surface, snow, ice, standing water, or another suitable condition.

Surface monitoring system 102 uses the plurality of lasers to determine whether ground 103 is uniform. In these examples, each of the plurality of lasers in surface monitoring system 102 identifies a distance between the laser and ground 103 and compares the distances. When the distances are different by at least a minimum value, laser 104 does not identify a distance between laser 104 and ground 103. The distances identified by surface monitoring system 102 may be different by at least the minimum value because ground 103 is not uniform.

In some advantageous embodiments, tire monitoring system stores a radius of tire 110 after tire maintenance is performed. Tire maintenance includes filling tire 110 with a gas until the pressure between tire 110 and the rim on which tire 110 is located is a recommended pressure. The recommended pressure may be recommended by the airline, the manufacturer, or another suitable party. The recommended pressure may be based on the model, size, and material of the tire. The radius of tire 110 identified after tire maintenance is performed is referred to as a baseline radius.

Once tire monitoring system 116 identifies a baseline radius for tire 110, tire monitoring system 116 identifies the radius of tire 110 each time aircraft 101 begins operation. For example, tire monitoring system 116 identifies the radius of tire 110 each time aircraft taxis prior to takeoff.

When tire monitoring system 116 determines that the radius of tire 110 is below a particular value, tire monitoring system 116 may determine that tire 110 is overdeflected. Overdeflected means that the deflection of the tire is greater than a desired amount. For example, over deflected may be when the deflection of the tire is greater than a maximum amount of deflection recommended by the manufacturer of the tire or another suitable party. Deflection is the change in radius of tire 110 caused by the weight of aircraft 101 and other forces being applied to tire 110.

Tire monitoring system 116 also compares the radius of tire 110 to previous values for the radius of tire 110 to determine whether tire 110 is experiencing a greater rate of deflation than a maximum decrease in air pressure over a period of time.

In the event that tire monitoring system 116 determines that the radius is below a particular value and/or that the radius of tire 110 is experiencing a greater rate of deflation than a maximum decrease over the period of time, tire monitoring system 116 generates an indication, such as a log entry, an electronic mail, and/or an audiovisual alert.

In these examples, tire monitoring system 116 also identifies and monitors the radius of tire 112 using laser 106 in the same manner as tire 110. Likewise, tire monitoring system 116 identifies and monitors tire 114 using laser 108 in the same manner as tire 110.

Figure 2:
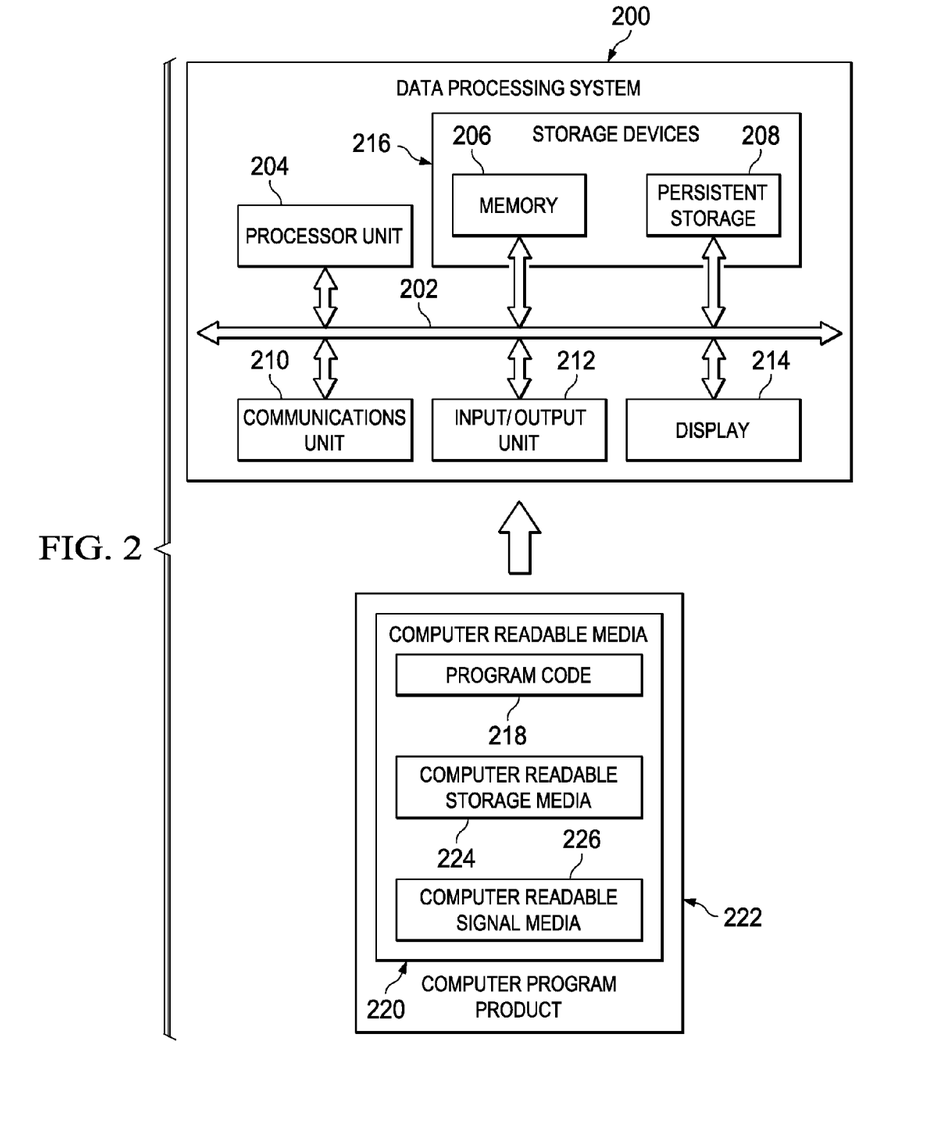
FIG. 2 depicts an illustration of a computer system in accordance with an advantageous embodiment.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The different advantageous embodiments recognize and take into account a number of different considerations. For example, the different advantageous embodiments recognize that a tire used to roll a vehicle while the tire is overdeflected may result in inconsistencies developing in the tire, at least due to heat in the tire or on the surface of the tire exceeding a temperature at which the materials within the tire are modified.

The inconsistencies may consist of separation of portions of the tire from other portions of the tire, a decreased ability of the tire to hold air pressure, or other suitable inconsistencies.

The different advantageous embodiments also recognize and take into account that pressure in a tire may decrease over time due to environmental factors, inconsistencies in the tire, or other suitable factors. The different advantageous embodiments allow a tire leaking air at a higher rate than other tires having the same parameters under the same circumstances to be identified and logged. The maintenance schedule of the tire and/or the aircraft may be modified to repair or replace the tire more quickly than under the standard maintenance schedule.

The different advantageous embodiments also recognize that tire pressure may increase while rolling due to the internal generation of heat. The tire pressure may decrease once the tire is no longer rolling and the temperature decreases to the ambient temperature. The different advantageous embodiments may remove values from the measurements of the radius of the tire identified during a particular time period after the tire rolls a measured distance. Alternatively, the different advantageous embodiments recognize that the absorbed tire energy may be estimated and added to the measurement for the radius of the tire.

The different advantageous embodiments also recognize that the weight of the aircraft may change due to airplane inertia and/or ambient conditions such as wind. In one advantageous embodiment, measurements of the radius of the tire that are outside a set of acceptable radii by more than a particular amount are rejected to prevent measurements that are affected by the change in weight of the aircraft from being stored.

Alternatively, the different advantageous embodiments recognize that the radius measurements may be normalized for the different weights of the aircraft. Normalization is a statistical process in which multiple sets of data are divided by a common variable in order to negate the variables' effect on the data. In these examples, the different advantageous embodiments divide each measurement of the radius by the weight measurement to normalize the radius measurements.

Thus, the different advantageous embodiments recognize and take into account that a first distance may be identified from a number of locations on the vehicle to the ground beneath the vehicle while the vehicle is on the ground. The first distance may be compared to a simulated distance between the number of locations and the ground in the same circumstances. If the first distance is not within a tolerance of the simulated distance, the different advantageous embodiments may store an indication of the distance and/or transmit the indication to an airline, a maintainer, or another suitable party.

Thus, the different advantageous embodiments provide an apparatus, method, and computer program product for monitoring a tire. An apparatus comprises a laser system comprising a number of lasers configured to identify a radius of a tire of a vehicle located on a ground, wherein a laser in the number of lasers is associated with an axle of the tire. The apparatus also comprises a tire monitoring system configured to identify a set of acceptable radii for the tire using a weight of the vehicle and information about the tire, determine whether the radius of the tire is within the set of acceptable radii, and generate an indication that the radius of the tire is not within the set of acceptable radii comprising the radius of the tire responsive to an absence of a determination that the radius of the tire is within the set of acceptable radii.

Figure 3:
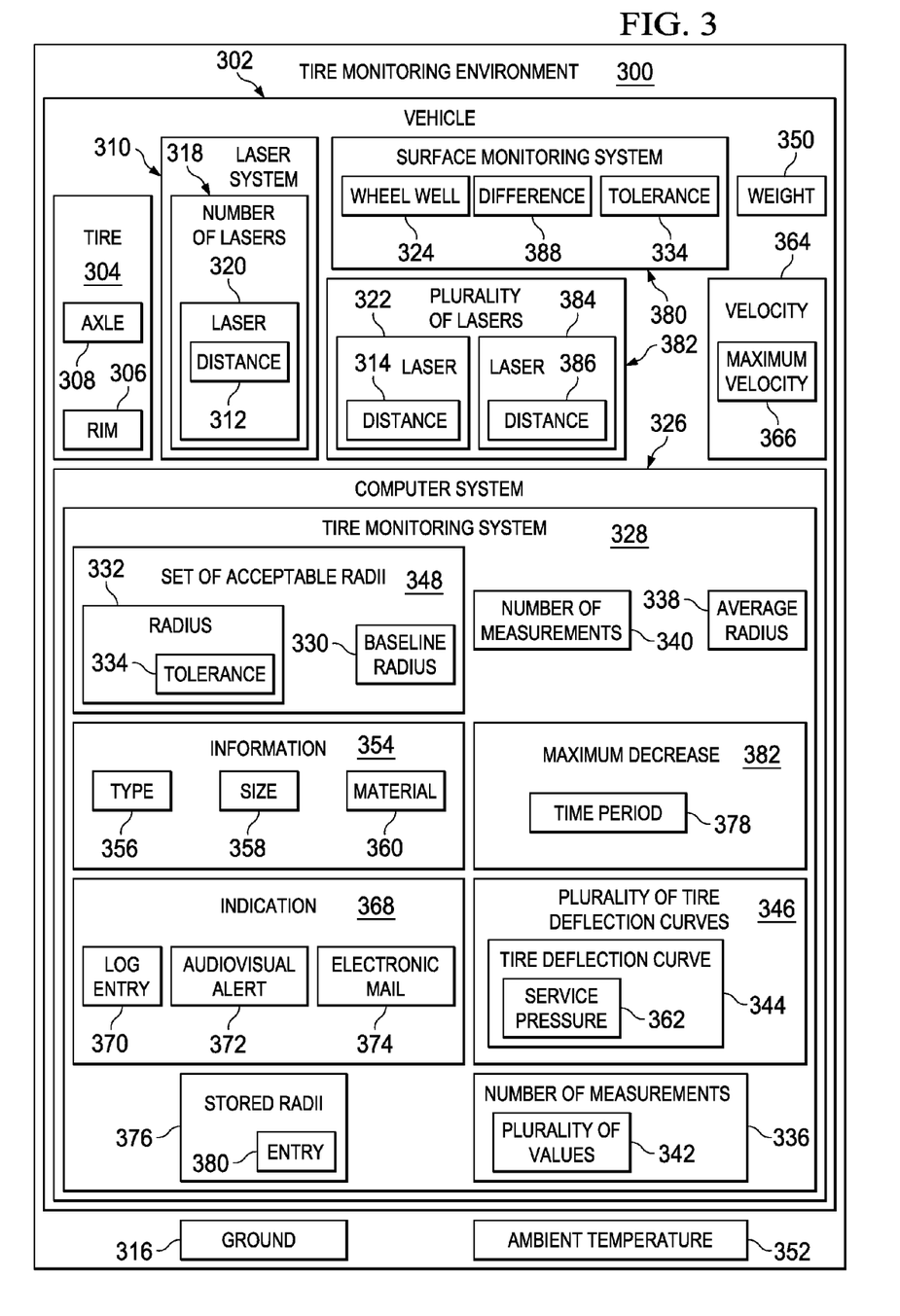
FIG. 3 depicts an illustration of a block diagram of a tire monitoring environment in accordance with an advantageous embodiment.

Turning now to FIG. 3, an illustration of a block diagram of a tire monitoring environment is depicted in accordance with an advantageous embodiment. Tire monitoring environment 300 is an environment in which advantageous embodiments may be implemented. Tire monitoring environment 100 in FIG. 1 is an example implementation of FIG. 3.

Tire monitoring environment 300 contains vehicle 302. Vehicle 302 is a conveyance that transports people or objects. Vehicle 302 may be mechanically propelled. In these examples, vehicle 302 is an aircraft. However, in other advantageous embodiments, vehicle 302 is an automobile, a motorcycle, a bicycle, a spacecraft, or another suitable conveyance.

Vehicle 302 consists of tire 304. Vehicle 302 may also contain additional tires for balance, stability, and/or propulsion. For example, an automobile has four tires. Tire 304 is a substantially round covering for rim 306. For example, tire 304 may be a 27×7.75R15 radial tire.

Rim 306 is a substantially round surface that rotates around axle 308 to move vehicle 302. Rim 306 has raised edges that allow tire 304 to form a seal around rim 306 such that air pressure may be generated between rim 306 and tire 304. Axle 308 connects vehicle 302 to rim 306. Axle 308 is configured such that rim 306 rotates around axle 308 to move vehicle 302.

Tire monitoring environment 300 also contains laser system 310. Laser system 310 measures the distance between a laser in laser system 310 and ground 316. Ground 316 is the surface on which vehicle 302 is located. In advantageous embodiments in which vehicle 302 is an aircraft, ground 316 is the surface on which the aircraft is located while the aircraft is landed.

Laser system 310 consists of number of lasers 318. Number of lasers 318 is a collection of lasers that measure distance from the location of the laser to ground 316. In this advantageous embodiment, laser system 310 consists of laser 320; however, laser system 310 consists of additional lasers in other advantageous embodiments.

Laser 320 measures distance 312. Distance 312 is the length between laser 320 and ground 316. In this advantageous embodiment, laser 320 is associated with axle 308. Laser 320 may be located on the center line of axle 320.

A first component may considered to be associated with a second component by being secured to the second component, bonded to the second component, fastened to the second component, and/or connected to the second component in some other suitable manner. The first component also may be connected to the second component using a third component. The first component may also be considered to be associated with the second component by being formed as part of and/or an extension of the second component.

Computer system 326 is also in tire monitoring environment 300. Computer system 326 is an example implementation of data processing system 200 in FIG. 2. Tire monitoring system 328 is a process running on computer system 326 in these examples. However, tire monitoring system 328 may be in the form of circuits, a programmable logic array, or other suitable hardware. Tire monitoring system 328 receives distance 312 from laser system 310.

Surface monitoring system 380 is also present in tire monitoring environment 300. Surface monitoring system 380 is an example implementation of surface monitoring system 104 in FIG. 1. In these examples, surface monitoring system 380 is located in wheel well 324 of vehicle 302.

Surface monitoring system 380 consists of plurality of lasers 382. Laser 322 and laser 384 are in plurality of lasers 382. Laser 322 identifies distance 314. Distance 314 is the length between laser 322 and ground 316. Laser 384 identifies distance 386. Distance 386 is the length between laser 384 and ground 316.

In some advantageous embodiments, surface monitoring system 380 identifies distance 314 and distance 386 each time laser 320 identifies distance 312. Surface monitoring system 380 generates difference 388 between distance 314 and distance 386. When difference 388 exceeds tolerance 334, laser system 310 does not identify distance 312. In other words, laser 320 does not identify distance 312.

In other advantageous embodiments, however, laser 320 identifies distance 312 regardless of difference 388. However, in such advantageous embodiments, tire monitoring system 328 running on computer system 326 rejects distance 312 when difference 388 is greater than tolerance 334. In yet other illustrative embodiments, tire monitoring system 328 rejects distance 312 when difference 388 is greater than tolerance 334 for a particular number of measurements for distance 312. Rejecting distance 312 means not accepting and/or using and/or storing distance 312.

In this advantageous embodiment, tire monitoring system 328 generates baseline radius 330 after tire maintenance is performed on vehicle 302 and prior to normal operation of vehicle 302. In advantageous embodiments in which vehicle 302 is an aircraft, normal operation of the aircraft is performing a flight. Tire maintenance consists of filling tires with a gas until the pressure in the tires meets the amount of pressure recommended by the manufacturer of the tires.

Tire monitoring system 328 identifies baseline radius 330 after tire maintenance is performed. Baseline radius 330 is identified by receiving distance 312. Distance 312 forms radius 332.

In using distance 312 to form radius 332, tire monitoring system 328 may modify distance 312 based on the location of laser 320. In other words, distance 312 may be increased or reduced to form radius 332. In these examples, laser 320 that identifies distance 312 is associated with axle 308. Thus, distance 312 is not modified. However, in other advantageous embodiments, number of lasers 318 consists of additional lasers located in locations other than axle 308. In such advantageous embodiments, the distance identified by such lasers may be increased or reduced to form radius 332. Additionally, tire monitoring system 328 may modify distance 312 based on the number of landings or other tire wearing events that have occurred since the tire was maintained.

Once distance 312 is modified, radius 332 is identified as distance 312. In some advantageous embodiments, number of measurements 336 of distance 312 are generated to identify radius 332. For example, number of measurements 336 may be about 50 measurements where distance 312 are modified to form radius values of tire 304. In such advantageous embodiments, plurality of values 342 may be removed from number of measurements 336 to form number of measurements 340. As used herein, a number of items means one or more items. In these examples, about 20 percent of the highest values and about 20 percent of the lowest values in number of measurements 336 are removed from number of measurements 336 to form number of measurements 340. Number of measurements 340 are then averaged to form average radius 338 of tire 304. Average radius 338 is then identified as radius 332.

Once radius 332 is identified, tire monitoring system 328 stores radius 332 as baseline radius 330. Tire monitoring system 328 then identifies tire deflection curve 344 from plurality of tire deflection curves 346 using weight 350 of vehicle 302 and information 354 about tire 302. Information 354 may consist of type 356 of tire 304, size 358 of tire 304, and/or material 360 of tire 304. Type 356 of tire 304 may include any of the manufacturer, model, and/or series of tire 304. Material 360 is a substance that makes up the surface of tire 304.

Plurality of tire deflection curves 346 is a collection of tire deflection curves. Each tire deflection curve 344 in plurality of tire deflection curves 346 designates set of acceptable radii 348 for tire 304 with service pressure 362 at ambient temperature 352 and loaded with weight 350 of vehicle 302. Service pressure 362 is the pressure value to which tire 304 is filled during tire maintenance. Thus, tire monitoring system 328 first selects tire deflection curves in plurality of tire deflection curves 346 that correspond to information 354 about tire 304 under weight 350 with service pressure 362 at ambient temperature 352. Then, tire monitoring system 328 identifies tire deflection curve 344 from the selected tire deflection curves. Tire deflection curve 344 is the deflection curve in the selected tire deflection curves that contains a data point for baseline radius 330 of tire 304.

Ambient temperature 352 is the temperature of the environment surrounding tire 304. Of course, tire 304 may change in temperature as the temperature of the environment around tire 304 changes. For example, the environment surrounding tire 304 may be a different temperature than the temperature of the environment surrounding tire 304 when tire maintenance was last performed on tire 304. Pressure of tire 304 at ambient temperature 352 may be calculated by tire monitoring system 328 using the following mathematical proportion:

$$\frac{T_{ambient}}{P_{ambient}} = \frac{T_{service}}{P_{service}},$$

where $T_{ambient}$ is ambient temperature 352, $P_{ambient}$ is the pressure of tire 304 at $T_{ambient}$, $T_{service}$ is the temperature of tire 304 at the time of tire maintenance, and $P_{service}$ is service pressure 362.

Once tire monitoring system 328 has identified tire deflection curve 344, tire monitoring system may monitor tire 304. More specifically, tire monitoring system 328 generates number of measurements 340 each time vehicle 302 begins operation. For example, in advantageous embodiments in which vehicle 302 is an aircraft, tire monitoring system 328 generates number of measurements 340 prior to each takeoff and while velocity 364 is below a maximum velocity 366. Tire monitoring system 328 may only receive number of measurements 340 while velocity 364 is less than maximum velocity 366. For example, maximum velocity 366 may be about 60 knots.

Tire monitoring system 328 receives number of measurements 340, stores radius 332 in stored radii 376, and determines whether radius 332 is within set of acceptable radii 348. Stored radii 376 is a collection of each radius 332 identified by tire monitoring system 328 since tire 304 was last maintained.

If radius 332 is not within set of acceptable radii 348, tire monitoring system 328 generates indication 368. Indication 368 may consist of log entry 370, audiovisual alert 372, and/or electronic mail 374. Of course, indication 368 may consist of any suitable electronic message. Indication 368 may be used by maintenance personnel to identify whether tire 304 is overdeflected. When tire 304 is overdeflected, maintenance personnel may maintain tire 304 before the next scheduled maintenance on tire 304.

When radius 332 is identified, tire monitoring system 328 also compares radius 332 to entry 380 in stored radii 376. Tire monitoring system 328 determines whether tire 304 is experiencing an inconsistency causing tire 304 to reduce pressure at a greater than expected rate. More specifically, tire monitoring system 328 identifies whether the difference between radius 332 and entry 380 is greater than maximum decrease 382. Entry 380 in stored radii 376 is a radius that was identified prior to time period 378 elapsing. For example, time period 378 may be one day and maximum decrease may be about three percent of the pressure in tire 304.

If tire monitoring system 328 determines that the difference between radius and entry 380 is greater than maximum decrease 382, tire monitoring system 328 generates indication 368.

The illustration of tire monitoring environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, tire monitoring system 328 does not determine whether the difference between entry 380 and radius 332 is greater than maximum decrease 382. Additionally, in advantageous embodiments in which tire monitoring system 328 does make such a determination, tire monitoring system 328 may adjust entry 380 for ambient temperature 352 prior to determining whether entry 380 differs from radius 332 by more than maximum decrease 382.

Additionally, tire monitoring system 328 is depicted as monitoring tire 304 in these examples. However, tire monitoring system 328 may monitor more than one tire for vehicle 302. In such advantageous embodiments, the tires may be monitored individually or by the axle on which the tires are located.

Figure 4:
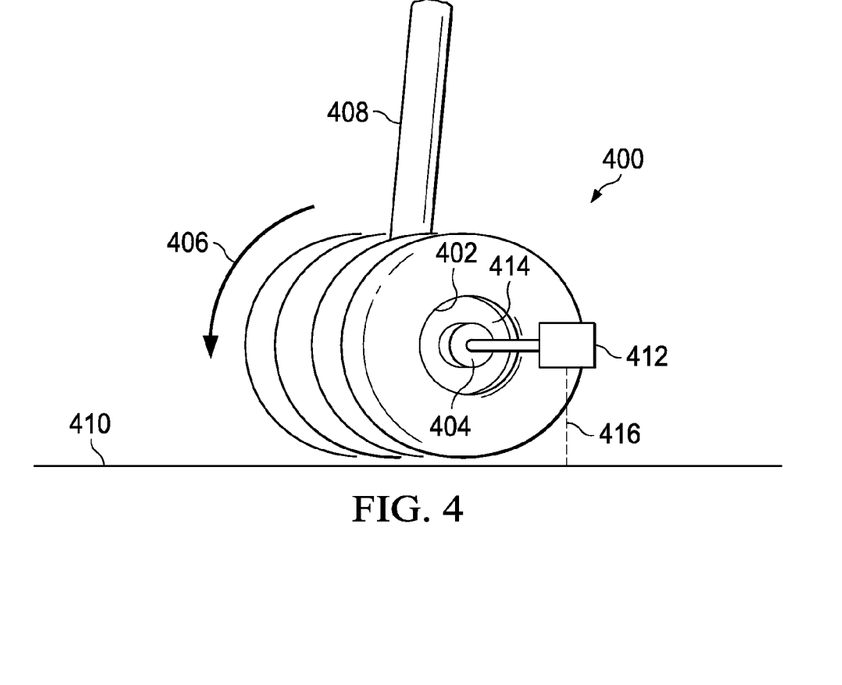
FIG. 4 depicts an illustration of a laser system in accordance with an advantageous embodiment.

Looking now to FIG. 4, an illustration of a tire is depicted in accordance with an advantageous embodiment. Tire 400 is an example implementation of tire 304 in FIG. 3.

Tire 400 is associated with rim 402 such that tire 400 forms a seal with rim 402 that substantially inhibits the escape of air from tire 400. Rim 402 is an example implementation of rim 306 in FIG. 3. Rim 402 is attached to axle 404 such that rim 402 rotates around axle 404 along ground 410 in direction 406. Support member 408 connects axle 404 to an aircraft such that at least part of the weight of the aircraft is supported by tire 400 and rim 402.

Laser 412 is associated with axle 404 in these examples. Laser 412 is associated with axle 404 by being attached to support member 414. Support member 414 is connected to axle 404 at the center line of axle 404. Laser 412 measures distance 416 and sends distance 416 to a tire monitoring system, such as tire monitoring system 328 in FIG. 3.

Figure 5:
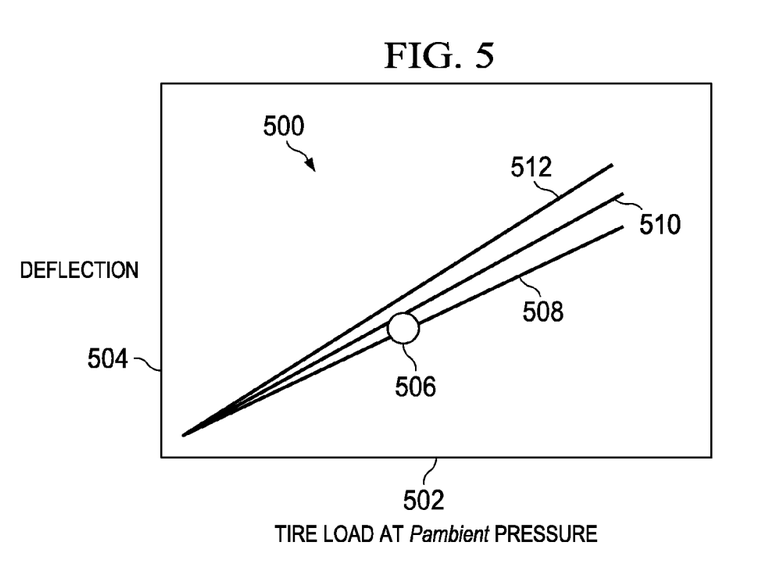
FIG. 5 depicts an illustration of a graph of tire deflection curves in accordance with an advantageous embodiment.

Turning now to FIG. 5, an illustration of a plurality of tire deflection curves is depicted in accordance with an advantageous embodiment. Plurality of tire deflection curves 500 are presented in graphical form in these examples. Plurality of tire deflection curves 500 are presented such that a deflection is shown for a given load at a particular ambient pressure. In this advantageous embodiment, tire deflection curves 508, 510, and 512 are in plurality of tire deflection curves 500. Of course, other tire deflection curves may also be present in plurality of tire deflection curves 500 for different ambient pressure values.

Assume that a tire monitoring system is identifying a baseline radius and a tire deflection curve for the tire after tire maintenance has been performed. A load on a tire has been identified as value 502. The tire monitoring system then identifies the baseline radius as value 504. Point 506 represents the point on the graph representing values 502 and 504.

The tire monitoring system identifies that point 506 is located on tire deflection curve 508. Thus, the tire monitoring system stores tire deflection curve 508 for monitoring the tire until the next time that tire maintenance is performed on the tire.

Figure 6:
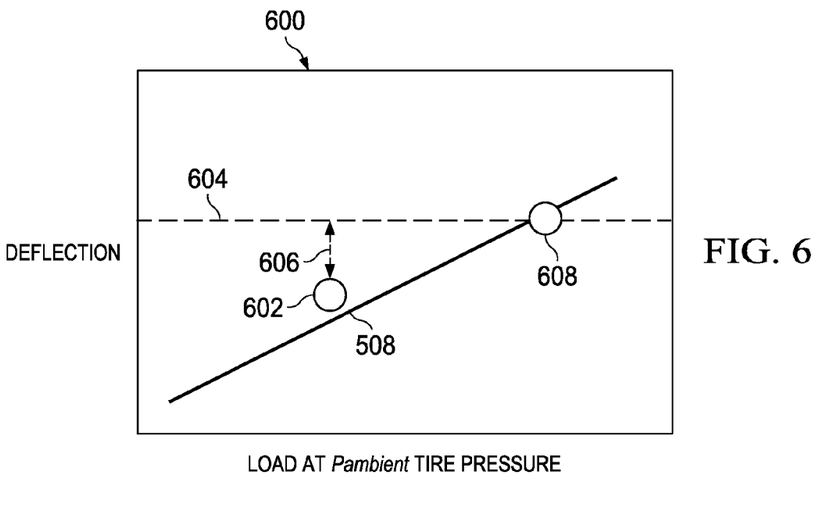
FIG. 6 depicts an illustration of a graph of tire deflation curves in accordance with an advantageous embodiment.

Looking now to FIG. 6, an illustration of a graph of a tire deflection curve is depicted in accordance with an advantageous embodiment. Tire deflection curve 508 is depicted in on graph 600 in this advantageous embodiment. Tire deflection curve 508 is an example implementation of tire deflection curve 344 in FIG. 3.

In this advantageous embodiment, assume that about ten days have passed since tire maintenance was performed and tire deflection curve 508 was identified. The tire monitoring system has identified the current radius of the tire and load on the tire at point 602. Point 602 indicates that deflection has increased since tire maintenance was performed such that point 602 is not located on tire deflection curve 508. In other words, the radius of the tire has decreased since tire maintenance was performed to the value represented by point 602.

Maximum deflection line 604 represents the maximum recommended deflection of the tire by the manufacturer, the airline, or another suitable party. Point 602 is below maximum deflection line 604 by amount 606. The area below maximum deflection line 604 represents a set of acceptable radii, such as set of acceptable radii 348 in FIG. 3. Thus, the current radius of the tire for the current load on the tire indicates that the current radius is within the set of acceptable radii.

Point 608 represents a point at which the tire is indicated as overdeflected. If point 608 represented the deflection of the tire at the load on the tire for the ambient pressure, the tire monitoring system would generate an indication that the tire is overdeflected. The indication may include the current radius of the tire.

Figure 7:
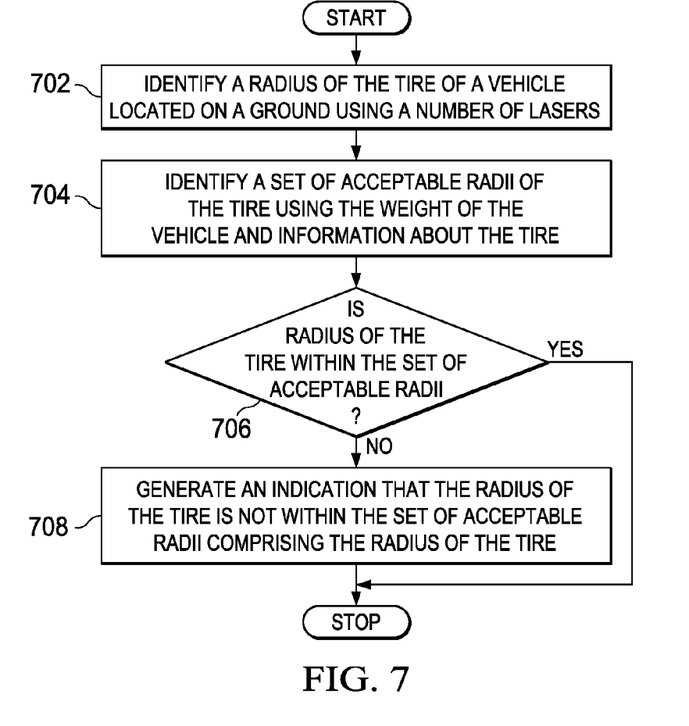
FIG. 7 depicts a flowchart of a process for monitoring a tire in accordance with an advantageous embodiment.

Turning now to FIG. 7, an illustration of a flowchart of a process for monitoring a tire is depicted in accordance with an advantageous embodiment. The process may be implemented by tire monitoring system 328 in tire monitoring process 300 in FIG. 3.

The process begins by identifying a radius of the tire of a vehicle located on a ground using a number of lasers (operation 702). Each of the number of lasers identifies a distance from the laser to the surface beneath the vehicle. The process then identifies a set of acceptable radii of the tire using the weight of the vehicle and information about the tire (operation 704). The set of acceptable radii may take the form of a tire deflection curve, such as tire deflection curve 344 in FIG. 3.

The process then determines whether a radius of the tire is within the set of acceptable radii (operation 706). The process may determine whether the radius is within the set of acceptable radii by determining whether the radius of the tire is within a particular tolerance of the tire deflection curve. The process may also determine whether the radius is within the set of acceptable radii by determining whether the radius of the tire is such that the deflection of the tire is less than a maximum amount of deflection for the tire deflection curve.

If the process determines at operation 706 that the radius of the tire is within the set of acceptable radii, the process terminates. If at operation 706 the process determines that the radius of the tire is not within the set of acceptable radii, the process generates an indication that the radius of the tire is not within the set of acceptable radii comprising the radius of the tire (operation 708). The indication may consist of any combination of log entry, audio alert, visual alert, and/or electronic mail. The process terminates thereafter.

Figure 8:
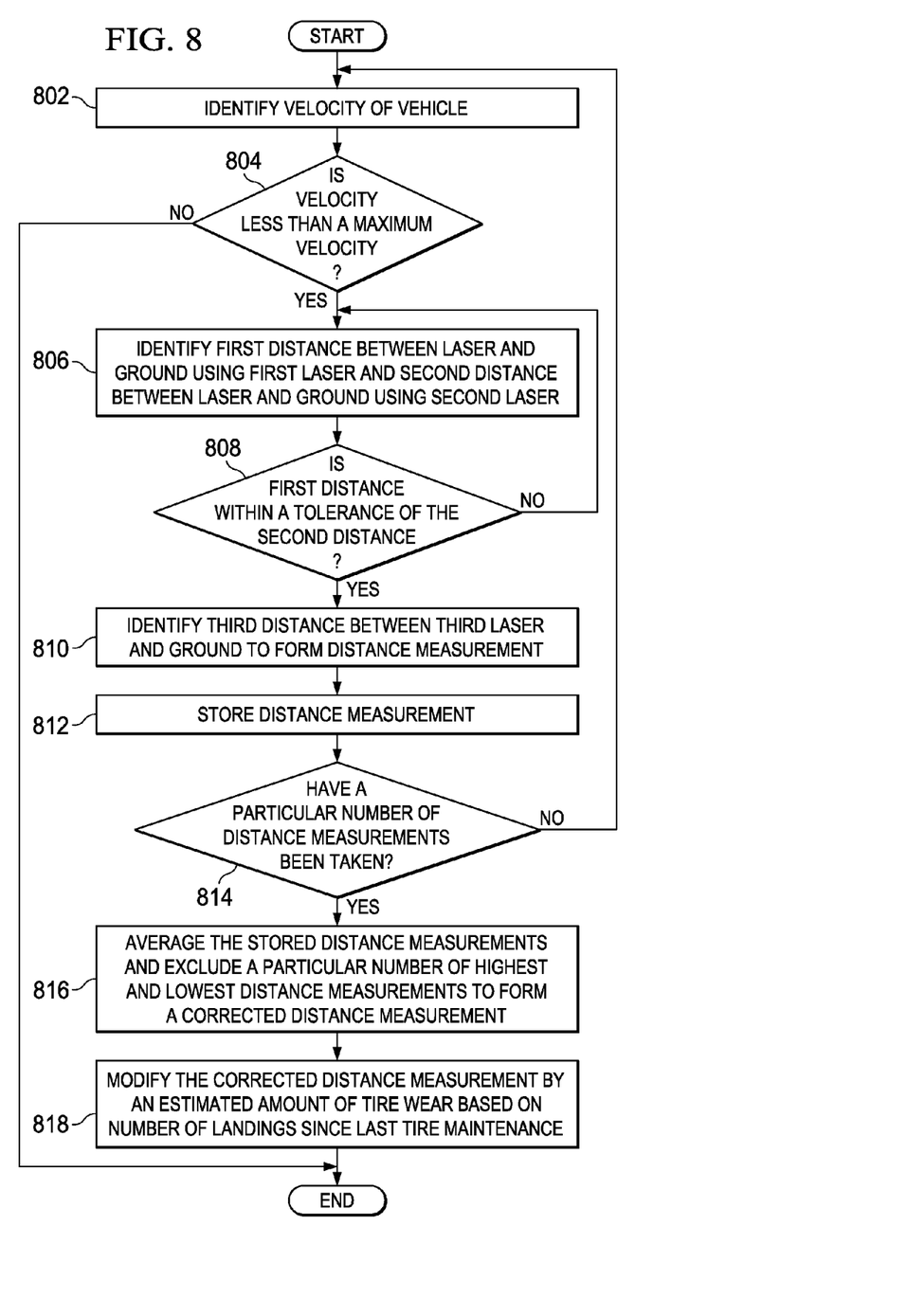
FIG. 8 depicts a flowchart of a process for identifying a distance between a laser and the ground in accordance with advantageous embodiment.

Turning now to FIG. 8, a flowchart of a process for identifying a distance between a laser and the ground is depicted in accordance with advantageous embodiment. The process may be implemented by tire monitoring system 328 in tire monitoring process 300 in FIG. 3.

The process begins by identifying a velocity of the vehicle (operation 802). The process then determines whether the velocity is less than a maximum velocity (operation 804). If at operation 804 the process determines that the velocity is not less than a maximum velocity, the process terminates. If at operation 804 the process determines that the velocity is less than a maximum velocity, the process identifies a first distance between a laser and the ground using a first laser and a second distance between a laser and the ground using a second laser (operation 806). The first laser and second laser are components of a surface monitoring system, such as surface monitoring system 380 in FIG. 3. In these examples, the first and second lasers are located in the wheel well of the vehicle. In some advantageous embodiments, the process also identifies the weight of the aircraft being applied to the tire and/or axle at the time that operation 806 is performed.

The process then determines if the first distance is within a tolerance of the second distance (operation 808). If at operation 808 the process determines that the first distance is not within a tolerance of the second distance, the process returns to operation 806. In these examples, the process returns to operation 806 because the ground beneath the vehicle is determined to be non-uniform. If at operation 808 the process determines that the first distance is within a tolerance of the second distance, identifies a third distance between a third laser and the ground to form a distance measurement (operation 810). The third laser is associated with the axle of the wheel for the tire in these examples. the process stores the distance measurement (operation 812).

The process then determines if a particular number of distance measurements have been taken (operation 814). If at operation 814 the process determines that the particular number of distance measurements have not been taken, the process returns to operation 802. If at operation 814 the process determines that the particular number of distance measurements have been taken, the process averages the stored distance measurements and excludes a particular number of highest and lowest distance measurements to form a corrected distance measurement (operation 816).

In some advantageous embodiments, the process modifies each of the stored distance measurements based on the weight of the aircraft at the time each of the stored distance measurements was stored prior to performing operation 816. In other words, the process may increase each of the stored distance measurements by the amount the radius of the tire was decreased due to the weight of the aircraft being applied to the tire and the axle.

The process then modifies the corrected distance measurement by an estimated amount of tire wear based on a number of landings since the last tire maintenance (operation 818). In some advantageous embodiments, the process also modifies the corrected distance measurement by an estimated amount of change in the radius of the axle due to the weight of the aircraft being applied to the axle. The process terminates thereafter.

Figure 9:
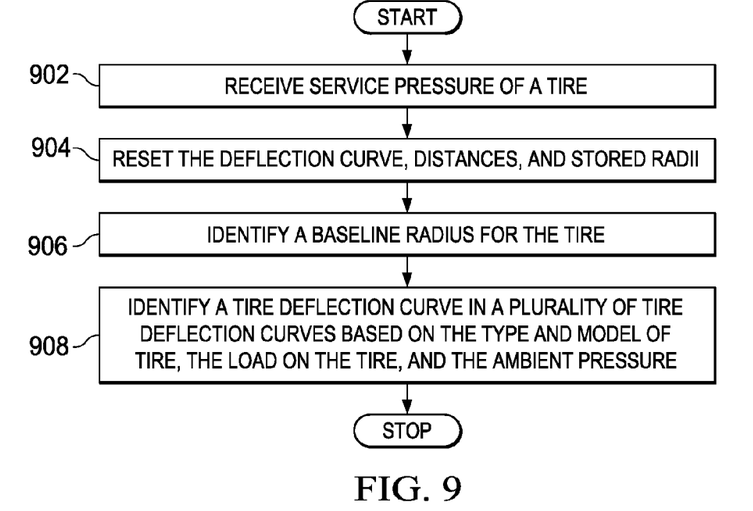
FIG. 9 depicts a flowchart of a process for reporting a distance between a laser and the ground in accordance with an advantageous embodiment.

With reference now to FIG. 9, a flowchart of a process for reporting a distance between a laser and the ground is depicted in accordance with an advantageous embodiment. The process may be implemented by tire monitoring system 328 in tire monitoring process 300 in FIG. 3.

The process begins by receiving a service pressure of a tire (operation 902). The process then resets the deflection curve, distances, and stored radii (operation 904). Next, the process identifies a baseline radius for the tire (operation 906). In some advantageous embodiments, the process may identify the baseline radius using the process depicted in FIG. 8. The process then identifies a tire deflection curve in a plurality of tire deflection curves based on the type and model of the tire, the load on the tire, and the ambient pressure (operation 908). The process may also modify the deflection curve to increase the amount of deflection for a given load and pressure for a particular period of time. For example, the process may increase deflection by about three percent for each day since tire maintenance was performed. The process terminates thereafter.

Figure 10:
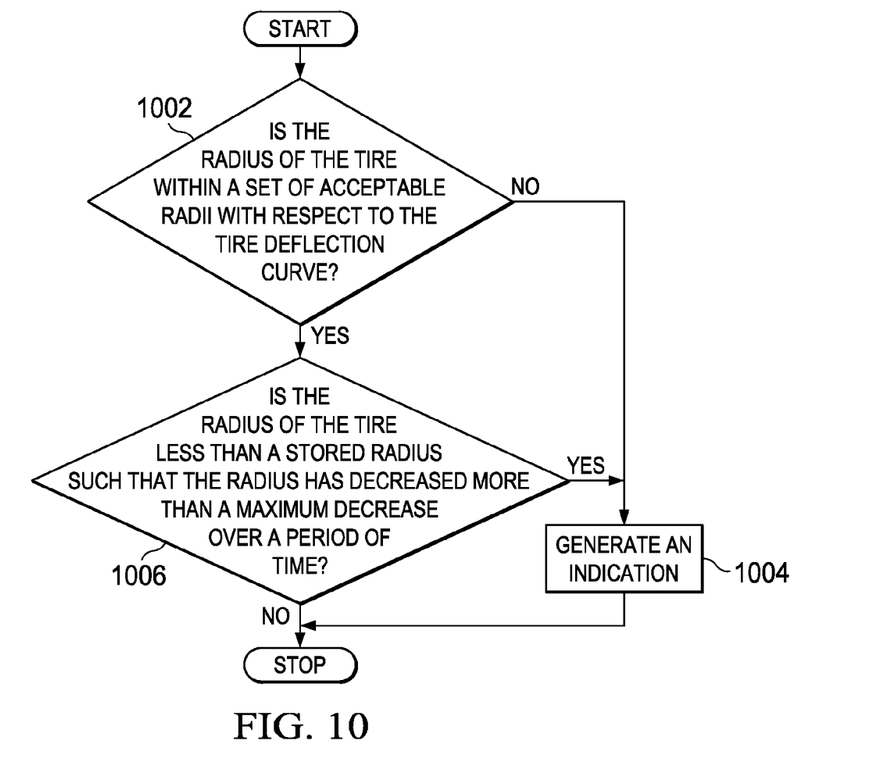
FIG. 10 depicts a flowchart of a process for calibrating a tire monitoring system in accordance with an advantageous embodiment.

Turning now to FIG. 10, a process for calibrating a tire monitoring system is depicted in accordance with an advantageous embodiment. The process may be performed after operation 816 in FIG. 8. The process may be implemented by tire monitoring system 328 in tire monitoring process 300 in FIG. 3.

The process begins by determining if the radius of the tire is within a set of acceptable radii with respect to the tire deflection curve (operation 1002).

If at operation 1002 the process determines that the radius of the tire is not within a set of acceptable radii with respect to the tire deflection curve, the process generates an indication (operation 1004) and terminates thereafter.

If at operation 1002 the process determines that the radius of the tire is within a set of acceptable radii with respect to the tire deflection curve, the process then determines if the radius of the tire is less than a stored radius such that the radius has decreased more than a maximum decrease over a period of time (operation 1006).

If at operation 1006 the process determines that the radius of the tire is less than a stored radius such that the radius has decreased more than a maximum decrease over a period of time, the process generates an indication (operation 1004). The indication may consist of a log entry, an email message, an audiovisual alert, or another suitable alert. The process terminates thereafter.

If at operation 1006 the process determines that the radius of the tire is not less than a stored radius such that the radius has decreased more than a maximum decrease over a period of time, the process terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, the process may not perform operation 812 in advantageous embodiments in which only one measurement is taken. Additionally, the process may perform additional actions at operation 814 to form the corrected distance measurement. For example, the process may generate a weighted average by time for the distance, and/or the process may not exclude the number of highest and lowest distance measurements.

Additionally, the process may generate multiple indications at operation 1004. The process may generate a log entry and send an electronic mail, for example. The process may also generate other indications, such as transmitting the radius and/or the tire deflection curve to a maintenance facility each time a period elapses. For example, the process may transmit the radius and the tire deflection curve to a maintenance facility every 24 hours.

Thus, the different advantageous embodiments allow tire deflection to be monitored between tire maintenance. By monitoring tire deflection, the maintainers of a vehicle are made aware of potential inconsistencies in a tire without having to take the vehicle to perform the tire maintenance. Deflection may be accurately identified by identifying the tire deflection curve that corresponds to the tire. Therefore, each type of tire may be monitored for the amount of deflection and/or deflation for which the type of tire is rated.

The tire monitoring system accounts for inconsistencies in the ground used for the distance measurements by rejecting distances from two lasers that are not within a tolerance of each other, as well as removing a number of the highest and lowest values. Additionally, the tire monitoring system prevents indications from being generated when the radius of the tire is decreased due to normal wear of the tire. The tire monitoring system modifies radius measurements based on the number of landings of the aircraft to consider the wear on the tire in identifying the radius and the deflection. The tire monitoring system may also modify the radius measurements based on the change in radius of the axle due to the weight of the aircraft being applied to the axle.

Thus, the different advantageous embodiments provide an apparatus, method, and computer program product for monitoring a tire. An apparatus comprises a laser system comprising a number of lasers configured to identify a radius of a tire of a vehicle located on a ground, wherein a laser in the number of lasers is associated with an axle of the tire. The apparatus also comprises a tire monitoring system configured to identify a set of acceptable radii for the tire using a weight of the vehicle and information about the tire, determine whether the radius of the tire is within the set of acceptable radii, and generate an indication that the radius of the tire is not within the set of acceptable radii comprising the radius of the tire responsive to an absence of a determination that the radius of the tire is within the set of acceptable radii.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
 a laser system comprising a number of lasers configured to identify a radius of a tire of a vehicle located on a ground, wherein a laser in the number of lasers is associated with an axle of the tire;
 a tire monitoring system configured to identify a set of acceptable radii for the tire using a weight of the vehicle and information about the tire, determine whether the radius of the tire is within the set of acceptable radii, and generate an indication that the radius of the tire is not within the set of acceptable radii in response to an absence of a determination that the radius of the tire is within the set of acceptable radii.

2. The apparatus of claim 1, wherein the laser is a first laser and further comprising:
 a surface monitoring system comprising a plurality of lasers associated with a wheel well for the tire in the vehicle, wherein the surface monitoring system is configured to determine whether the ground is uniform.

3. The apparatus of claim 1, wherein the radius is a first radius, and wherein the number of lasers are further configured to identify a second radius after the tire is maintained and prior to the number of lasers identifying the first radius of the tire to form a baseline radius.

4. The apparatus of claim 3, wherein in being configured to identify the set of acceptable radii for the tire using the weight of the vehicle and the type of the tire, the tire monitoring system is configured to identify a tire deflection curve from a plurality of tire deflection curves based on the weight of the vehicle, the information about the tire, and the baseline radius.

5. The apparatus of claim 4, wherein the information about the tire is selected from a type of the tire, a size of the tire, and a material for the tire.

6. The apparatus of claim 1, wherein in being configured to identify the radius of the tire of the vehicle located on the ground, the number of lasers are configured to generate a number of measurements for the radius of the tire.

7. The apparatus of claim 5, wherein the number of measurements is a first number of measurements, and wherein in being configured to determine whether the radius of the tire is within the set of acceptable radii, the tire monitoring system is configured to remove a plurality of values from the first number of measurements to form a second number of measurements, and generate an average radius for the tire from the number of measurements to form the radius of the tire.

8. The apparatus of claim 1, wherein the tire monitoring system is configured to determine whether the radius of the tire is within the set of acceptable radii when a velocity of the vehicle is less than a maximum velocity.

9. The apparatus of claim 1, wherein the indication is selected from a log entry, an audiovisual alert, and an electronic mail.

10. The apparatus of claim 1, wherein the tire monitoring system is further configured to determine whether the radius has decreased more than a maximum decrease during a time period.

11. The apparatus of claim 1, wherein the indication comprises the radius of the tire.

12. The apparatus of claim 2, wherein the laser system is configured to identify the radius of the tire of the vehicle located on the ground responsive to a determination that the ground is uniform.

13. A method for monitoring a tire comprising:
 identifying a radius of the tire of a vehicle located on a ground using a number of lasers, wherein a laser in the number of lasers is associated with an axle of the tire;
 identifying a set of acceptable radii of the tire using the weight of the vehicle and information about the tire;
 determining whether a radius of the tire is within the set of acceptable radii; and
 responsive to an absence of a determination that the radius of the tire is within the set of acceptable radii, generating an indication that the radius of the tire is not within the set of acceptable radii comprising the radius of the tire.

14. The method of claim 13, wherein the laser is a first laser and further comprising:
 determining whether the ground is uniform using a surface monitoring system, wherein the surface monitoring system comprises a plurality of lasers associated with a wheel well for the tire in the vehicle.

15. The method of claim 13, wherein the radius is a first radius, and further comprising:
 identifying a second radius after the tire is maintained and prior to the number of lasers identifying the first radius of the tire to form a baseline radius.

16. The method of claim 15, wherein the step of identifying the set of acceptable radii for the tire using the weight of the vehicle and the type of the tire further comprises:
 identifying a tire deflection curve from a plurality of tire deflection curves based on the weight of the vehicle, the information about the tire, and the baseline radius.

17. The method of claim 13, wherein the information about the tire is selected from a type of the tire, a size of the tire, and a material for the tire.

18. The method of claim 13, wherein the step of identifying the radius of the tire of the vehicle located on the ground using the number of lasers comprises:
 generating a number of measurements for the radius of the tire.

19. The method of claim 13, wherein the indication comprises the radius of the tire.

20. A computer program product comprising:
 a non-transitory computer readable storage device;
 program code, stored on the computer readable storage device, for identifying a radius of the tire of a vehicle located on a ground using a number of lasers;
 program code, stored on the computer readable storage device, for identifying a set of acceptable radii of the tire using the weight of the vehicle and information about the tire;
 program code, stored on the computer readable storage device, for determining whether a radius of the tire is within the set of acceptable radii; and
 program code, stored on the computer readable storage device, for generating an indication that the radius of the tire is not within the set of acceptable radii comprising the radius of the tire responsive to an absence of a determination that the radius of the tire is within the set of acceptable radii.

* * * * *